United States Patent
Paine et al.

[15] 3,654,036
[45] Apr. 4, 1972

[54] APPARATUS FOR APPLYING COVER SLIDES

[72] Inventors: Thomas O. Paine, Administrator of the National Aeronautics and Space Administration with respect to an invention of; Robert L. Oliver, Granada Hills; Edward F. Zimmerman, Newhall, both of Calif.

[22] Filed: Jan. 28, 1970

[21] Appl. No.: 6,615

[52] U.S. Cl. .......................... 156/510, 156/250
[51] Int. Cl. .......... B32b 31/10, B32b 31/18, B32b 31/20
[58] Field of Search .................. 156/250, 510, 515, 101

[56] References Cited

UNITED STATES PATENTS

| | | |
|---|---|---|
| 3,375,152 | 3/1968 | Lundberg et al............156/250 |
| 3,453,801 | 7/1969 | Stohlquist...................156/515 |
| 2,365,085 | 12/1948 | Joyce..........................156/101 |
| 1,985,520 | 12/1934 | Schafer.......................156/101 |
| 2,726,706 | 12/1955 | Hakomaki...................156/515 |
| 3,486,957 | 12/1969 | Fish et al.....................156/515 |
| 3,526,169 | 9/1970 | Levenson....................156/515 |
| 3,475,261 | 10/1969 | Ehove et al.................156/510 |

Primary Examiner—Benjamin A. Borchelt
Assistant Examiner—James V. Doramus
Attorney—G. T. McCoy, J. H. Warden and Monte F. Mott

[57] ABSTRACT

Apparatus for applying thin glass slides to solar cells in an assembly line manner including a conveyor belt, a cartridge feeder for consecutively feeding cells onto the conveyor belt, and rollers for feeding a long strip or coil of thin flexible glass along a path parallel to the conveyor belt. The cells and sheet are first sprayed with an adhesive, moved through a drying chamber, and moved together by rollers that press down the glass sheet. After the strip and cells have been pressed together, they pass through a drying chamber and are ready for separating. The strip is separated by applying hot wires to the strip around each cell to which it is held and thereafter breaking the strip at these parting lines.

3 Claims, 5 Drawing Figures

Patented April 4, 1972
3,654,036
2 Sheets-Sheet 1
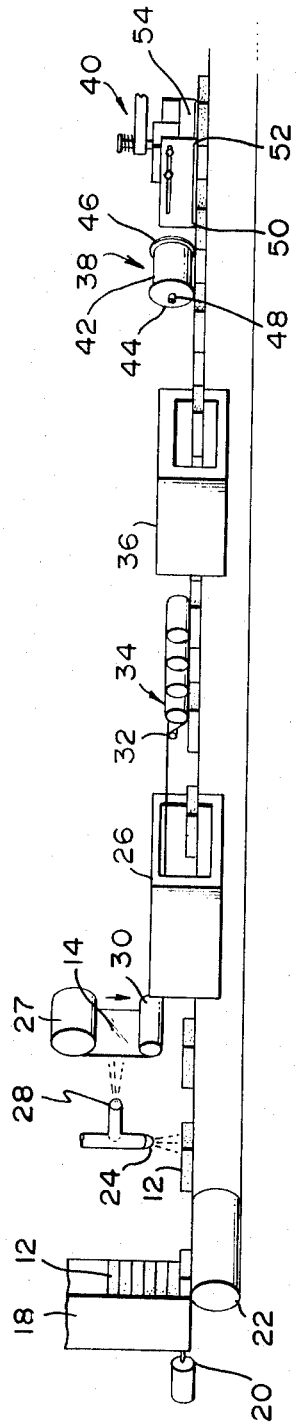
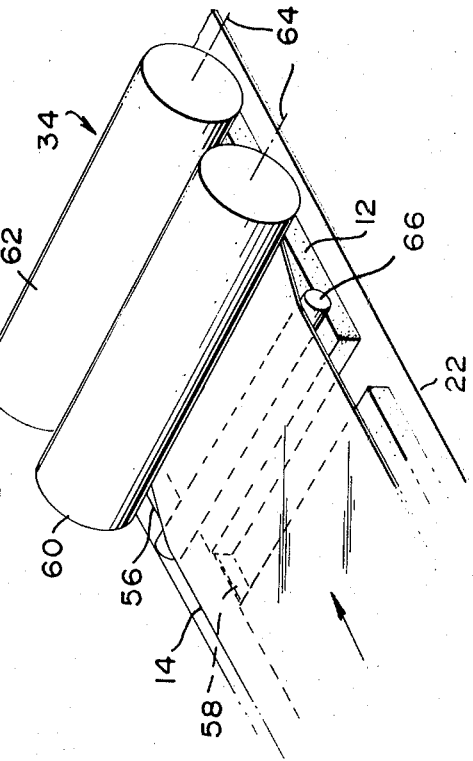
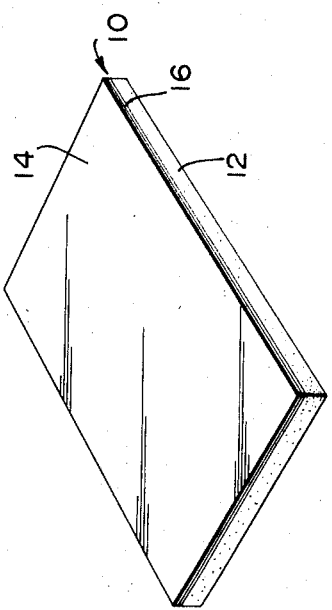
INVENTORS
ROBERT L. OLIVER
EDWARD F. ZIMMERMAN
BY
ATTORNEYS Patented April 4, 1972

INVENTORS
ROBERT L. OLIVER
EDWARD F. ZIMMERMAN
BY

ATTORNEYS

APPARATUS FOR APPLYING COVER SLIDES

ORIGIN OF THE INVENTION

The invention described herein was made in the performance of work under a NASA contract and is subject to the provisions of Section 305 of the National Aeronautics and Space Act of 1958, Public Law 85-567 (72 Stat. 435; 42 USC 2457).

BACKGROUND OF THE INVENTION

1. Field of the Invention

This invention relates to methods and apparatus for applying thin covering material to cells.

2. Description of the Prior Art

Solar cells which are used on space vehicles are generally covered with a thin layer of glass to shield them from electromagnetic radiation and micrometeorite damage. Very thin covers are used to reduce the weight of the vehicle, which may carry thousands of solar cells. The small thickness of the glass covers makes them difficult to handle without breaking.

OBJECTS AND SUMMARY OF THE INVENTION

An object of the present invention is to provide apparatus for applying an extremely thin layer of hard covering material to each of a large number of cells.

Another object of the invention is to provide a method for rapidly and easily applying thin glass covers to solar cells.

In accordance with one embodiment of the invention, a method is provided for rapidly applying covers to solar cells in a uniform manner. The method includes successively placing uncovered cells, or cell bases, on a conveyor belt or the like so that they move in a continuous train along the belt. A roll of thin flexible glass slightly wider than the cells is moved by rollers along a path portion which extends parallel to the path of the cells. At a first station the top of the cells and the bottom of the glass strip are sprayed with adhesive. At a second stage, the cells and glass strip pass through an adhesive drying chamber parallel to each other, but with the glass spaced above the cells. At a next station, rollers press the glass strip against cells beneath it, and the cells with the continuous strip joining them passes through a curing chamber. The cells and strip then pass along a station where a wheel with hot wires on either side is applied to the strip to form a parting line on either side of each cell. Another pair of hot wires is applied immediately before and after each cell. The parting lines defined by the hot wires allows the glass strip to be broken so as to leave only the glass immediately above each cell. The small overhanging cover regions are then ground away to finish the cells.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a complete cell constructed in accordance with the present invention;

FIG. 2 is an isometric representative view of a simplified assembly line, constructed in accordance with the invention, for applying covers to uncovered cells to create cells of the type shown in FIG. 1;

FIG. 3 is a partial perspective view of the roller apparatus of the assembly line of FIG. 2;

DESCRIPTION OF THE PREFERRED EMBODIMENTS

Figure 4:
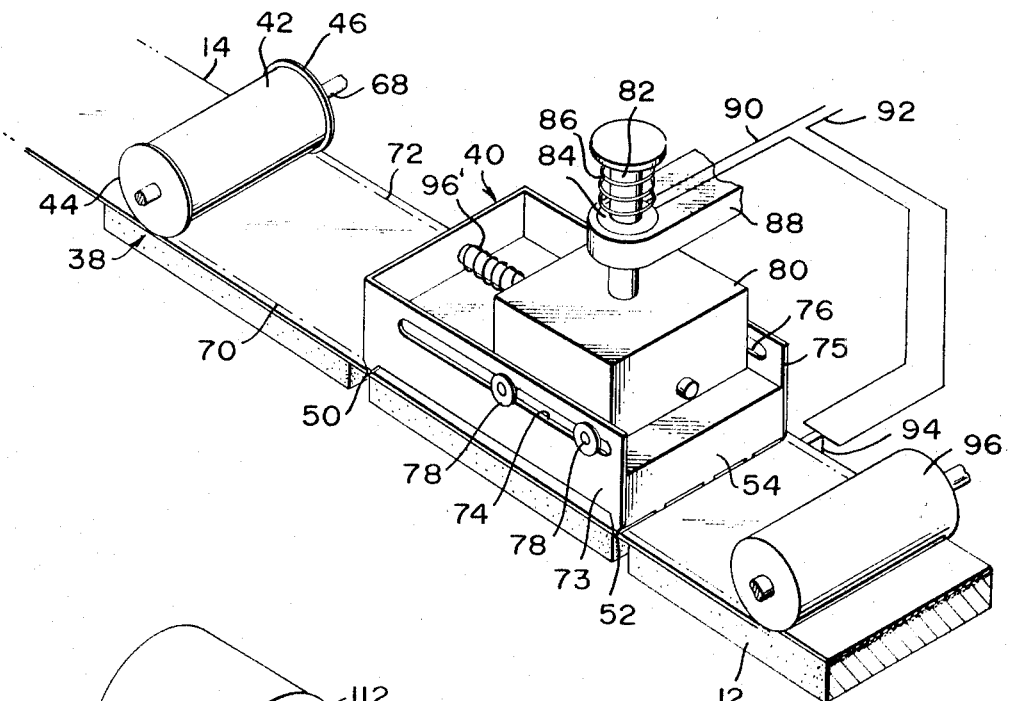
FIG. 4 is a partial perspective view of the parting mechanism in the assembly line of FIG. 2.

FIG. 1 illustrates a complete solar cell assembly 10 which includes a cell base 12 of silicon and a cover 14 of glass which is held to the base by a thin layer of adhesive 16. The cell typically has a width of 2 centimeters, a length of 6 centimeters and a thickness of ten thousandths inch. In such a cell, the base 12 is typically about eight thousandths inch thick, while the cover 14 and adhesive 16 are each about one thousand inch thick. During development of the cells, cells were constructed using separate glass covers 14, individually applied to cell bases. However, the covers were extremely difficult to handle, because of their small thickness and great brittleness, and a large amount of breakage was encountered. Flexible glass is available for this purpose, but even this material is highly subject to breakage. A typical space vehicle may employ twenty thousand separate cells, so it is highly desirable to provide a way to rapidly produce the cells with a minimum of handling.

FIG. 2 is a simplified view of a production line for applying thin glass covers to cells. The cell bases 12 are held in a cartridge 18, and are fed by a solenoid operated plunger 20 onto a conveyor belt 22. The conveyor belt moves the cells along a path that takes them past an adhesive spraying head 24 where adhesive is applied to their upper faces, and a drying chamber 26 where the adhesive is dried. Thin flexible glass covering material 14 is supplied as a roll 27 or long strip, with a width about 20 percent greater than the width of the cell bases. The cover glass material 14 moves past another spraying head 28 where adhesive is sprayed onto its lower surface, and around a roller 30 that directs the cover material through the drying chamber 26. The strip of cover material is then moving parallel to the cells, although spaced vertically from them.

After the strip of cover material 14 emerges from the drying chamber, a roller 32 diverts it downwardly toward a set of pressure rolls 34 that press the strip against the top of cell bases moving along the conveyor belt. The train of cells with the strip glued to its upper surface then passes through a curing chamber 36 which may contain infrared lamps, to cure the adhesive that holds the cover material to the cells. In order to complete the cells, all of the cover material around each cell base must be removed.

The removal of the cover material is accomplished by first forming four parting lines in the strip around each cell base. The strip then can be broken at these parting lines, and the small overhanging portions ground away to finish the cell. The formation of the parting lines is accomplished by the use of a pair of hot wire mechanisms 38, 40. The first hot wire mechanism 38 includes a wheel 42 with a pair of wires 44, 46 that encircle it, and which lie near opposite edges of the covering strip. Each of the wires 44, 46 is connected to a current source that heats it so that it forms a fracture where it touches the glass strip. The wheel 42 is rotatably mounted on a shaft 48 so that the wheel rolls when the wires contact the strip of covering material, to create a parting line at each side of the strip. The strip of covering material 14 is wider than the cell bases 12, and the wires 44, 46 are located just outside of each cell base.

The second parting mechanism 40 includes a pair of wires 50, 52 that extend substantially perpendicular to the path of cells moving along the conveyor belt. A sensor which detects the leading edge of each cell base, operates a solenoid which lowers a supporting block 54 that holds the hot wires 50, 52, so the wires contact the strip of covering material. The supporting block 54 is mounted so that it can slide a short distance parallel to the path of the strip and cell bases while current flows through the wires 50, 52 to heat them. The wires are mounted so that they contact the strip at positions immediately behind and in front of each cell base. Accordingly, the strip and cell bases leaving the parting mechanism 40 have parting lines completely surrounding each cell base for facilitating the breaking of the covering material.

FIG. 3 illustrates some of the rolls of the roll mechanism 34 which moves down the covering strip 14 against the cell bases 12. In order for parting lines to be accurately located on the strip 14, the bases 12 must be accurately located along the conveyor belt 22. This is accomplished by utilizing a guide 56 with a locating edge 58 that can contact one side of the cell bases 12. The guide 56 has a height which is less than that of the cell bases so that it does not contact the covering strip 14 when the strip is on the cell bases. The rolls, such as rolls 60, 62 of the roll assembly are canted, or skewed, so that they urge the strip 14 and cell bases 12 thereunder towards the locating edge 58. The skewing is accomplished by orienting the axes 64 of the rolls at a small angle such as several degrees from a line perpendicular to the path of the conveyor belt 22. As shown in the Figure, a roll 66 is included that directs the cover strip 14 from a path that is vertically spaced above the cell bases 12 along a downward incline path portion and under the rolls such as rolls 60, 62 which push the strip against the cell bases.

FIG. 4 illustrates the parting mechanisms 38, 40 in greater detail. The hot wires 44, 46 are mounted on the cylinder 42 which is rotatably mounted on a shaft 68 that is fixed in position except that it can move up and down slightly to keep the wires 44, 46 against the cover sheet 14. The mechanism forms a pair of parting lines 70, 72 which are lines of a fracture in the upper surface of the glass cover material. The other parting mechanism 40 includes guide plates 73, 75 which hold the support block 54 on which the hot wires 50, 52 are located. The guide plates have slots 74, 76 which receive slider bearings 78 on a frame 80, to guide the support block 54 in motion parallel to the path of the cells. The frame 80 is fixed to an iron plunger 82 that can move through a solenoid 84. A spring 86 urges the plunger 82 in an upward direction so that the hot wires 50, 52 are normally spaced above the sheet 14. However, when the solenoid 84 is energized, the plunger 82 moves down, causing the support block 54 and hot wires 50, 52 thereon to move down onto the sheet 14.

The solenoid 84 is held by a rod 88 that is fixed in position, and it is energized by wires 90, 92 that are connected to a current source. A sensor 94 which senses the leading edge of the cell bases 12, is located in series with the wires 90, 92. When the sensor 94 detects the leading edge of a cell base 12, it closes the solenoid circuit so that the solenoid is energized to cause the hot wires to move down against the covering strip 14. The solenoid 84 remains energized for a brief period of time which is sufficient for the wires 50, 52 to form parting lines in the covering material. During this period, the wires 50, 52 move along with the covering strip, since the block 54 on which they are held can slide. After this brief period, the solenoid is de-energized and the frame 80 moves up, carrying the block 54 and hot wires upwardly. The block 54 then returns to its original position under the force of a horizontal return spring 96.

The parting lines formed by the four hot wires 44, 46, 50 and 52 enable the covering strip 14 to be easily broken at regions immediately about each cell base 12. This breaking is performed automatically by a soft rubber roller 96 which bears down against the covering strip, and which breaks overhanging portions of the strip at the sides and between adjacent cell bases. Alternatively, such breaking can be performed by hand. The parting lines are formed so that there is still a small overhanging portion of glass around each cell base. This is removed by grinding the excess region away to form the final cell.

Figure 5:
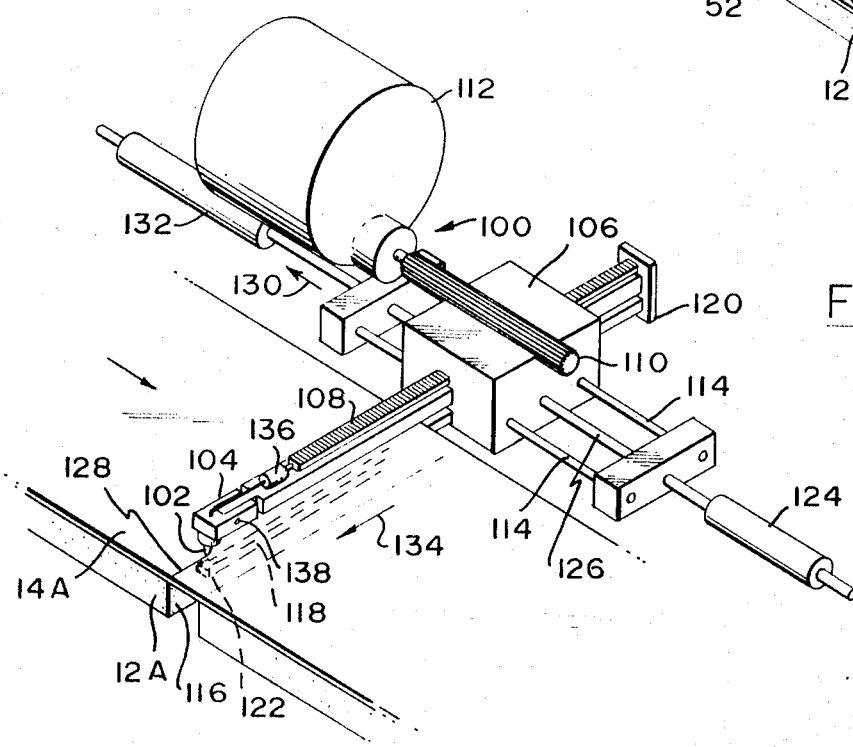
FIG. 5 is a partial perspective view of a parting mechanism constructed in accordance with another embodiment of the invention.

FIG. 5 illustrates a mechanism 100 for forming parting lines, constructed in accordance with another embodiment of the invention. The mechanism includes a diamond scribe point 102 which can move laterally across the top of a glass cover strip 14A which joins many cells 12A. The point 102 is mounted on a guide bar 104 which is slidably mounted on a block 106. The guide bar has a rack 108 which is engaged by a long pinion 110 that is driven by a gear head motor 112. Thus, when the motor 112 is energized, it can cause the point 102 to move across the cover strip, forming a parting line therein. Inasmuch as the cells and cover strip are continuously moving, it is necessary to allow the scribe point 102 to move along with the strip. This is accomplished by mounting the block 106 on a pair of bars 114 that guide the block in motion substantially parallel to the path of the cells and strip.

The scribe point 102 must always lie slightly ahead of the leading edge 116 of a cell. In order to achieve good registration with the leading edge of the cell, a registration member 118 is provided which abuts the leading edge 116. The registration member 118 is also slidably mounted in the block 106 and has a rearward end attached by a fastener 120 to the rearward end of the guide bar 104. The forward end 122 of the registration member lies immediately below the scribe point 102 to assure good registration even if the cell 12A is not precisely oriented. As the scribe point 102 is driven in a lateral direction by the gear head motor 112, the registration member 118 is pushed along the path of the strip, and it causes the block 106 to move therealong, causing the scribe point to always lie immediately in front of the leading edge of the cell. While the amount of friction of the block 106 along its rods 114 can be made very low by ball bearing runners or the like, a further reduction in the force on the registration member required to move the block is achieved by a solenoid 124. The solenoid 124 moves an armature 126 which is attached to the block 106, to urge the block to move with the cover strip 14A. However, the force supplied by the solenoid 124 is slightly less than the minimum friction of the block, so that it never moves the block 106 by itself. The force supplied by the solenoid 124 does, however, reduce the amount of force which must be applied to the registration member 118 to move the block 106 and the guide bar 104 and scribe point 102 thereon.

After the scribe point 102 has formed a parting line 128 completely across the cover strip 14A, it remains in a rearward position out of the path of the cells 12A, while the block 106 is moved in the rearward direction of arrow 130 by another solenoid 132. When the trailing edge of the cell 12A has been sensed, the motor 112 is energized in a reverse direction to move the guide bar 104 in the direction of arrow 134 across the strip 14A. During this movement, the scribe point 102 is lifted by a lifting solenoid 136 which pivots the end of the guide bar 104 about an axis 138. The mechanism is then ready to draw another line along the leading edge of the next cell. The drawing of lines at the trailing edge of each cell can be accomplished by another mechanism similar to mechanism 100, but which is held against the trailing edge. If the cells are uniformly spaced from each other, then a pair of scribe points 102 can be utilized on the same guide bar 104. After the lines have been scribed, the glass can be broken in the manner described above for the embodiment shown in FIG. 4.

Thus, the invention provides a method and apparatus for rapidly applying thin brittle covers to cells. This is accomplished by feeding a strip and a train of uncovered cells or cell bases, along parallel paths that merge. In this manner, the regions of the glass covering which are to be applied to each cell base pass through a drying chamber which dries adhesive on them and the cell bases at the same time. Accordingly, only one drying chamber and controls for it are required. After the adhesive has dried, the strip is moved down against the cell bases to press them together. The same roller that press the strip down against the bases is used to move the bases against a locating edge that accurately locates the cells for the later parting operation. After the cells move through a curing chamber, parting lines are automatically formed in the sheet, and the sheet is then broken at the parting lines. The parting lines are formed by hot wires, although they can be formed by sandblasting, diamond scribers or the like. The cells are then ready for final finishing.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus for placing thin covers of brittle material on cells comprising:
conveyor means for moving cells;
means for serially feeding cells onto said conveyor means;
means for feeding a strip of said cover material over cells moving along said conveyor means;
means for adhesively joining said strip to upper surfaces of said cells;
means for forming parting lines extending only partially through said cover material at regions between adjacent cells on said conveyor means; and
means for bending said strip of cover material downwardly toward the space between adjacent cells to break it along said parting lines.

2. Apparatus for placing thin covers on cells comprising:
conveyor means for moving cells;
means for serially feeding cells onto said conveyor means;
means for feeding a strip of cover material which is wider than said cells onto cells moving along said conveyor means;
means defining a locating edge extending beside the path of cells moving along said conveyor means, said locating edge extending at a height below said cover material on said cells so that a side of each cell can bear against the locating edge while a side portion of the strip overhangs the locating edge;
a roller assembly including a roller for pressing said cover material against said cells and means for mounting said roller to turn about an axis which is skewed from a line perpendicular to the path of said cells along said conveyor means, to urge the cells under it towards said locating edge; and
means for forming a parting line in said strip of cover material along at least one side thereof at a location above a side of the cells.

3. Apparatus for placing thin covers of brittle material on cells comprising:
conveyor means for moving cells;
means for serially feeding cells onto said conveyor means;
means for feeding a strip of cover material onto cells moving along said conveyor means;
means for pressing said cover material against said cells; and
means for forming parting lines in said cover material at regions between adjacent cells on said conveyor means, including a scribing point, means for moving said point laterally across said strip of cover material, means for guiding said point in movement parallel to the path of said conveyor means as said point moves laterally across said strip, and registration means for abutting the leading edge of cells under said strip for maintaining said point immediately in front of the leading edge of the cell.

* * * * *